United States Patent [19]

Lange

[11] Patent Number: 4,758,469
[45] Date of Patent: * Jul. 19, 1988

[54] PAVEMENT MARKINGS CONTAINING TRANSPARENT NON-VITREOUS CERAMIC MICROSPHERES

[75] Inventor: Roger W. Lange, St. Paul, Minn.

[73] Assignee: Minnesota Mining and Manufacturing Company, St. Paul, Minn.

[*] Notice: The portion of the term of this patent subsequent to Jan. 14, 2003 has been disclaimed.

[21] Appl. No.: 35,989

[22] Filed: Apr. 8, 1987

Related U.S. Application Data

[63] Continuation of Ser. No. 818,202, Jan. 13, 1986, abandoned.

[51] Int. Cl.$^4$ .......... B32B 9/00; B32B 18/00; G02B 5/128; C03C 12/02
[52] U.S. Cl. .......... 428/325; 428/331; 428/402; 427/137; 501/34; 350/105; 404/14
[58] Field of Search .......... 428/325, 331, 402; 427/137; 350/105; 404/12, 14; 501/34, 133; 423/338

[56] References Cited

U.S. PATENT DOCUMENTS

| | | | |
|---|---|---|---|
| 2,218,909 | 10/1940 | Gill | 350/105 X |
| 2,326,634 | 8/1943 | Gebhard et al. | 350/105 |
| 2,963,378 | 12/1960 | Palmquist | 106/183 |
| 3,355,311 | 11/1967 | Gosselink | 350/105 X |
| 3,709,706 | 1/1973 | Sowman | 106/57 |
| 3,795,524 | 3/1974 | Sowman | 106/65 |
| 3,849,351 | 11/1974 | Jorgensen | 260/18 |
| 3,872,217 | 3/1975 | Merz et al. | 423/338 |
| 4,069,281 | 1/1978 | Eigenmann | 264/1 |
| 4,116,866 | 9/1978 | Finlayson | 106/38.7 |
| 4,117,192 | 9/1978 | Jorgensen | 428/337 |
| 4,138,336 | 2/1979 | Mendel et al. | 210/198.2 |
| 4,145,112 | 3/1979 | Crone et al. | 404/14 X |
| 4,166,147 | 8/1979 | Lange | 428/328 |
| 4,248,932 | 2/1981 | Tung et al. | 428/325 |
| 4,255,286 | 3/1981 | Berek et al. | 252/448 |
| 4,292,035 | 9/1981 | Battrell | 252/8.6 |
| 4,299,874 | 11/1981 | Jones et al. | 428/331 X |
| 4,367,919 | 1/1983 | Tung et al. | 350/105 |
| 4,388,359 | 6/1983 | Ethen | 428/143 |
| 4,412,018 | 10/1983 | Finlayson et al. | 106/287.25 |
| 4,434,076 | 2/1984 | Mardis et al. | 106/27 |
| 4,490,432 | 12/1984 | Jordan | 428/220 |
| 4,564,556 | 1/1986 | Lange | 428/325 |

OTHER PUBLICATIONS

Urbanek, V., "Preparation of Microspheres With High Refractive Indexes By A Sol-Gel Method", *Nukleon*, 1978, (Abstract).
Matijevic, E., Surface and Colloid Science, vol. 6, 1973. pp. 77–78.

*Primary Examiner*—John E. Kittle
*Assistant Examiner*—Susan S. Rucker
*Attorney, Agent, or Firm*—Donald M. Sell; James A. Smith; Douglas B. Little

[57] ABSTRACT

Pavement marking comprising ceramic microspheres held by a binder, said microspheres being solid, transparent, non-vitreous, ceramic particles which serve as lens elements in the retroreflective pavement markings. The ceramic microspheres formed by various sol gel techniques are characterized by having:

A. at least one metal oxide phase; and
B. an average minimum dimension of up to 125 micrometers.

The inventive pavement markings retain reflectivity for a surprisingly long time.

8 Claims, 1 Drawing Sheet

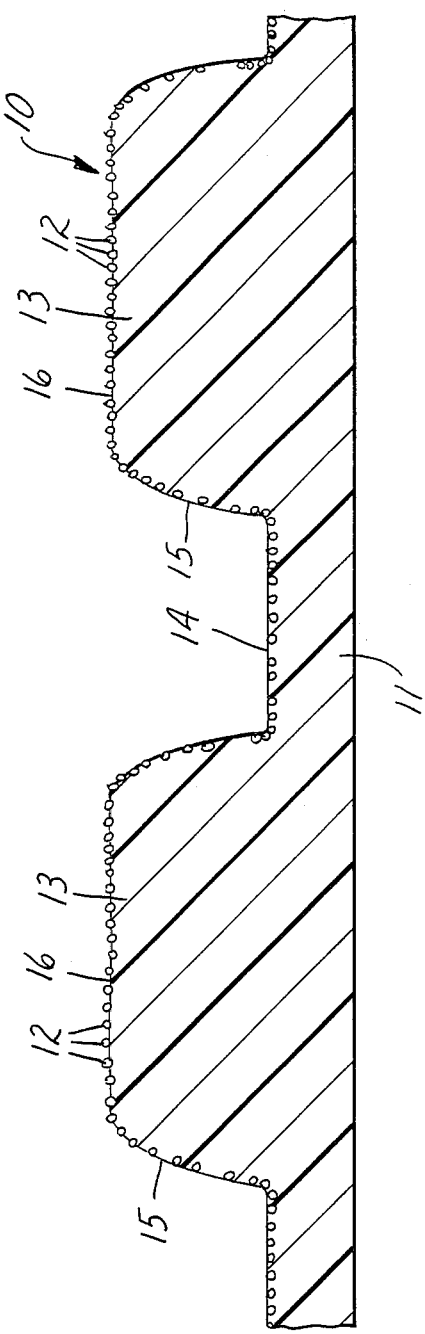

PAVEMENT MARKINGS CONTAINING TRANSPARENT NON-VITREOUS CERAMIC MICROSPHERES

This is a continuation of application Ser. No. 818,202 filed Jan. 13, 1986 now abandoned.

TECHNICAL FIELD

This invention relates to the field of pavement markings containing transparent microspheres for reflectorizing the markings.

BACKGROUND

The pavement marking industry has long desired transparent, solid microspheres or beads that would be useful as brighter and more durable retroreflective lens elements in pavement markings. The transparent microspheres now most widely used for pavement markings are made of certain glasses, which are amorphous vitreous materials. Generally these glasses are of the soda-lime-silicate type having a refractive index of only about 1.5, which limits their retroreflective brightness. Glass microspheres can be scratched or chipped by grit and dirt particles on the highway.

DISCLOSURE OF INVENTION

By this invention it has been found that certain ceramic microspheres can be included in a pavement marking to obtain surprisingly long retroreflective durability. The pavement markings comprise the ceramic microspheres held by a binder. The microspheres are solid, transparent, non-vitreous, ceramic microspheres comprising at least one crystalline phase comprised of at least one metal oxide other than titanium dioxide, although titanium dioxide may be present in minor amounts. The microspheres can be made in various sizes. For many uses, sizes less than 125 micrometers are preferred and offer certain advantages. The inventive pavement markings include microspheres having an average particle size of up to 125 micrometers, though such pavement markers may also comprise other microspheres mixed among the ceramic microspheres already described, said other microspheres being of the same description as the ceramic microspheres except that they have an average particle size greater than 125 micrometers.

The ceramic microspheres used in pavement markings of the invention can be made by sol-gel processes. Generally, a sol-gel process is one which converts a colloidal dispersion, sol, aquasol or hydrosol of a metal oxide (or precursor thereof) to a gel. A gel is a material form wherein one or more of the components are cross-linked either chemically or physically to such an extent as to cause a three dimensional network to form. The formation of this network results in an increase in the viscosity of the mixture and a mechanical immobilization of the liquid phase within the network. The gelling step is often followed by drying and then firing to obtain a ceramic material.

A transparent ceramic microsphere made by a sol-gel process from silica and zirconium compounds is taught in U.S. Pat. No. 3,709,706, and one that comprises titanium dioxide is taught in U.S. Pat. No. 4,166,147. However, neither of these patents, nor any other known art, teaches or suggests that such microspheres would provide surprisingly long retroreflective durability in a pavement marking.

The term solid means a body which is not hollow, i.e. lacking any substantial cavities within the microspheres such as described in U.S. Pat. No. 4,349,456 directed to ceramic metal oxide microcapsules.

The term non-vitreous, for purposes of this description, means that the ceramic has not been derived from a melt or mixture of raw materials brought to the liquid state at high temperature. This term is used for the purpose of distinguishing the transparent ceramic microspheres from glass beads which are made by a melt process.

The term transparent, for purposes of this discussion means that the ceramic microspheres when viewed under an optical microscope (e.g., at 100×) have the property of transmitting rays of visible light so that bodies beneath the microspheres, such as bodies of the same nature as the microspheres can be clearly seen through the microspheres, when both are immersed in oil of approximately the same refractive index as the microspheres. Although the oil should have a refractive index approximating that of the microspheres, it should not be so close that the microspheres seem to disappear (as they would in the case of a perfect index match). The outline, periphery or edges of bodies beneath the microspheres are clearly discernible.

The transparent ceramic microspheres can be made fully dense. The term fully dense means close to theoretical density and having substantially no open porosity detectable by standard analytical techniques such as the B.E.T. nitrogen technique (based upon adsorption of $N_2$ molecules from a gas with which a specimen is contacted). Such measurements yield data on the surface area per unit weight of a sample (e.g. $m^2/g$) which can be compared to the surface area per unit weight for a mass of perfect microspheres of the same size to detect open porosity. Higher specific surface ($m^2/g$) indicates higher surface irregularities and/or porosity. Such measurements may be made on a Quantasorb apparatus made by Quantachrome Corporation of Syosset, N.Y. Density measurements may be made using an air or water pycnometer.

The microspheres described herein may be truly spherical but may also be oblate or prolate.

The preferred ceramic microspheres are also generally characterized by: an average hardness greater than sand, which is an abrasive material often found on roads; toughness, crush resistance, sphericity and retroreflectivity as great or greater than those of conventional glass beads having a similar size and a refractive index of about 1.5; and an index of refraction of between about 1.4 and 2.6. The preferred microspheres also have fewer internal imperfections and inclusions than conventional glass beads of a similar size.

The pavement markings of this invention include sheet materials for application to road surfaces and also lane marking lines in which the microspheres are dropped onto wet paint or hot thermoplastic (see U.S. Pat. No. 3,849,351) which serves as the binder. Coating compositions comprising the transparent ceramic microspheres described herein mixed with binder materials, such as paint, are also included within the scope of this invention.

BRIEF DESCRIPTION OF THE DRAWING

The FIGURE is a cross-sectional view of one embodiment of the inventive pavement marker comprising a patterned polymeric sheet having a surface layer of transparent, ceramic microspheres.

DETAILED DESCRIPTION

The Transparent Ceramic Microspheres

The following list exemplifies the metals which form oxides useful in making the transparent ceramic microspheres used in this invention: aluminum, thorium, tin, yttrium, zirconium and mixtures of these oxides with each other and with other additives. The formulas for these oxides are exemplified by: $Al_2O_3$, $ThO_2$, $SnO_2$, $Y_2O_3$ and $ZrO_2$. Silicon dioxide is also useful.

The following list exemplifies other metals whose oxides can serve as useful materials in admixture with the above mentioned oxides: antimony, barium, beryllium, bismuth, boron, calcium, lead, magnesium, strontium, tantalum, zinc, and mixtures of the foregoing. These oxides are for the most part colorless or only weakly colored and are exemplified by BaO, BeO, $Bi_2O_3$, $B_2O_3$, CaO, PbO, $Sb_2O_5$, SrO, $Ta_2O_5$, MgO, and ZnO.

All of these oxides can be furnished in the form of aqueous sols or solutions of oxide precursors that are stable in a normal air environment, e.g., 23° C. and 50% relative humidity. More information on metal oxides appears in U.S. Pat. No. 4,349,456 Column 3, line 32–Column 4, line 5 which is incorporated by reference herein.

The ceramic microspheres which are made with a silica sol have an amorphous silica phase. Most of the metal oxides form a polycrystalline or microcrystalline phase. There are many useful combinations of a polycrystalline metal oxide phase with an amorphous phase such as silica.

Whereas prior-art glass microspheres used as retroreflective elements have a generally uniform, continuous, glassy structure, substantially free of crystallinity (e.g. less than 5 percent crystallinity), the microspheres used in this invention preferably have a subdivided or grainy structural nature, comprising a multiplicity of grains, such as amorphous remnants of colloidal silica particles, from a sol used in preparing the microspheres of the invention, or crystallites.

The grainy nature of microspheres used in this invention is desired because it makes the microspheres more tough and resistant to fracture. In contrast to the straight line fractures than can occur in a continuous glassy structure, fracture in a microsphere of the inventive pavement markers typically proceeds in a tortuous path along the boundaries between the grains, which requires greater energy. An important advantage of microspheres of the invention is their superior toughness.

The term grain will be used hereinafter as a term generic to crystallites in crystalline materials and to domains or colloidal particles in amorphous materials. For best reflective brightness, it is preferred that the size of grains in the microspheres be no larger than 1000 angstroms (crystallites preferably 50–400 angstroms, more preferably below 150 Angstroms) to minimize the effect of grain boundaries on light transmittance and also to minimize the effect of larger areas on light scattering especially with large differences in refractive index between different phases (e.g. crystalline $ZrO_2$ and amorphous $SiO_2$). In order to minimize light scattering, the largest dimension of the crystallites of a light transmissive material preferably is less than one quarter of the wavelength of the transmitted light. 1000 Angstroms is well below one quarter of the average wavelength of visible light which is about 5500 angstroms.

Voids in microspheres of the invention are desirably avoided, by firing the gelled microsphere precursors to a dense state, to improve transparency, to avoid the weakening effect that structural gaps can cause, and to avoid absorption of moisture or other liquids that can degrade the microspheres, e.g., through freeze-thaw cycles.

A study of the effect of silica on zirconia-silica microspheres has indicated that transparency is increased with decreasing silica colloid particle size. The size of the colloidal silica particles in the starting material can vary, for example from 10 to 1000 angstroms in largest dimension. A silica colloid particle size of less than about 200 angstroms (0.020 micrometers) is believed to yield zirconia-silica ceramic microspheres having better transparency.

From x-ray analyses of sol-gel zirconia-silica microspheres, it appears that the zirconia initially crystallizes in a predominantly pseudo-cubic form which then converts to tetragonal zirconia between about 910° and 1000° C. The microspheres become slightly more crystalline between 1000° and 1100° C., and it is within this temperature range, when the zirconia is mainly in the tetragonal form, that optimum hardness is achieved. As the microspheres are fired to higher temperatures (above 1100° C.) the cooled samples display a loss of transparency. Also, crystallite size can increase with higher temperatures and longer firing times.

Silica-containing compositions of this invention can be formed from a two phase system comprising an aqueous colloidal dispersion of silica (e.g., a sol or aquasol) and an oxygen containing metal compound which can be calcined to the metal oxide. The colloidal silica is typically in a concentration of about 1 to 50 weight percent in the silica sol. A number of colloidal silica sols are available commercially having different colloid sizes, see *Surface & Colloid Science*, Vol. 6, ed. Matijevic, E., Wiley Interscience, 1973. Preferred silicas are those which are supplied as a dispersion of amorphous silica in an aqueous medium (such as the Nalcoag Colloidal silicas made by Nalco Chemical Company) and those which are low in soda concentration and can be acidified by admixture with a suitable acid (e.g. Ludox LS colloidal silica made by E. I. DuPont de Nemours & Co. acidified with nitric acid).

The zirconium compounds useful in making zirconia-silica sol-gel ceramics can be organic or inorganic acid water-soluble salts, such as the zirconium salts of aliphatic or acyclic mono or di-carboxylic acids (e.g. formic, acetic, oxalic, citric, tartaric, and lactic acids). Zirconyl acetate compounds are particularly useful. Colloidal zirconia sols are commercially available. Useful inorganic zirconium compounds are zirconium sulfate and zirconium oxychloride. See U.S. Pat. No. 3,709,706 Column 4 line 61–Column 5 line 5 for further details on zirconia sources.

The other metal oxides mentioned earlier (e.g. $Al_2O_3$ or MgO) can be supplied as precursors such as water soluble salts, nitrates, halides, oxyhalides, phosphates, borates, carbonates, or salts of organic acids (mono- or di-carboxylic acids, oxoacids, hydroxy acids, amino acids or mixtures thereof).

In the case of zirconia-silica ceramics, the two major raw materials are usually present in the starting sol in amounts sufficient to provide equivalent $ZrO_2/SiO_2$ mole ratio in an aqueous dispersion in the range of about 10:1 to 1:10, preferably 5:1 to 1:5. As the proportion of the material having the higher index of refraction ($ZrO_2$) is increased, the refractive index of the resulting microspheres increases, thus allowing an adjustment of refractive index to suit different purposes.

The dispersion can be prepared by admixing a silica aquasol with an aqueous metal oxide precursor salt solution under agitation. For some starting materials, reverse order of addition (i.e. adding the metal oxide solution to the silica aquasol under agitation) can lead to non-uniform interspersal of the amorphous and crystalline grains in the final microsphere. The mixture is agitated in order to obtain a uniform dispersion without forming a floc or precipitate and may be filtered to remove extraneous material. The aqueous mixture of colloidal silica suspension and zirconium compound will generally be relatively dilute (e.g. 15 to 30 weight percent solids).

The transparent microspheres can be made by sol-gel processes which provide uncracked, fired, ceramic particles with a combination of retroreflective brightness and durability not available from known glass microspheres. Sol-gel processes also have the advantage of lower processing temperature than glass forming processes and thus less energy consumption per unit weight produced. Gelling may be done by a number of techniques, some of which are described hereinafter.

One improved sol-gel process is a thermal extractive gelling process in which gelation of a sol is induced by extraction of a carboxylic acid (e.g. acetic acid) from zirconyl carboxylate. The zirconyl carboxylate is a precursor of the zirconia component of the ceramic microspheres. The zirconyl carboxylate compound can be used in admixture with other zirconia sources.

In the thermal extractive gelation process, the extracting phase or extractant is typically an oil. Unsaturated oils, such as vegetable oil, corn oil, safflower oil, soybean oil, sunflower oil, peanut oil and various derivatives of these oils are suitable, and peanut oil has proven to be a convenient extractant and gel forming medium. During microsphere gelation, acetic acid liberated from droplets of the feed sol is absorbed by the hot oil. A portion of the acetic acid may escape by evaporation. The forming medium (e.g. peanut oil) can be regenerated by heating briefly above 118° C. to remove residual acetic acid.

Zirconyl acetate-silica sol precursor mixtures are generally concentrated (typically to about 20 to 50 weight percent fired solids) prior to introduction into the forming medium, in order to obtain a convenient density and viscosity for forming droplets, but concentration is not made so high as to cause premature gelation. Concentration has been done by rotoevaporation, which involves evaporating liquid from a heated, rotating vessel into a cooled receiving flask, often conducted under reduced pressure.

The precursor may be fed to the heated forming medium by a means which forms droplets in the forming medium. Such means would include adding the precursor as droplets and gelling them as such or adding it as a stream of liquid and shearing by agitation to produce droplets prior to gelation. Under the above-described conditions, a droplet of zirconyl acetate based sol rapidly gels, and a rigid microsphere can be produced in a matter of minutes, depending on microsphere size.

One other sol gel process which has been successfully used to make transparent microspheres is the chemical gelation process (as distinguished from a dehydrative gelation process). In this method gelation of a sol is induced by chemical disruption of the stability of the sol. Prior to gelation, which may take from a few seconds to several minutes, the composition can be added to a particle forming fluid under agitation to form spheres. The size of the spheres can be controlled by the degree of agitation.

One type of chemical gelation comprises adding to a metal oxide sol a gelling agent which alters the pH of the sol and induces gelation by a variety of chemical mechanisms. One variant of this method uses a colloidal zirconia preferably stabilized with an inorganic anion or an acid deficient zirconium salt (preferably inorganic) as the zirconia source and a silica sol as a silica source. These may be mixed and concentrated to obtain a mixed system of the desired viscosity. The sol mixture can be induced to gel by raising its pH, for example by adding ammonium acetate.

To be successfully applied to the preparation of ceramic beads, a chemical gelation technique should use a gelling agent which: (1) can be thoroughly mixed with the sol system without producing localized gelation; (2) gives sufficient working time to allow for the formation of spheres prior to the onset of gelation; and (3) leaves no appreciable residue upon combustion which might opacify or degrade the microspheres. The quantity of gelling agent to be used is found empirically, one method being to add gelling agent to the sol in small incremental amounts until gelation occurs within the desired time.

There is no universal particle forming fluid for chemical gelation, but most are substantially water immiscible. Some usable particle forming fluids are: hydrocarbons such as hexane and toluene, dichloroethane, carbon tetrachloride, 2-ethylhexanol, n-butanol, and trichloroethane. The appropriate forming fluid for a particular sol-gel system is found by experimentation. Generally, it is preferred that the volume of sol be 1 to 10 percent of the volume of forming fluid used.

After the microspheres have been gelled and formed, they are collected (e.g. by filtration) and fired or exposed to high temperatures in an oxidizing (e.g. air) atmosphere. Firing may be done at temperatures ranging between 500° to 1350° C. It is preferred that, in the case of zirconia ceramics, most of the zirconia component be in the tetragonal form and thus higher temperatures (above 900° C.) are preferred. In general, higher firing temperatures also help to achieve microspheres which are fully dense. In the firing process, the unfired ceramic microspheres should be loosely packed in order to obtain a uniform, free flowing fired product.

The hardness of the sol-gel microspheres is typically above 500 knoop. Knoop hardness measurements have been made of the ceramic sol-gel microspheres and certain controls. The representative hardness measurements given in Table 1 below and in the examples were done on microspheres which had been mounted in epoxy resin and polished to obtain a planar surface.

TABLE 1

| Sample Number | Main Constituents | Firing Temperature | Knoop Hardness Range | Average |
|---|---|---|---|---|
| 1 | $ZrO_2$—$SiO_2$ | 1100° C. | 703–863 | 797 |
| 2 | $ZrO_2$—$SiO_2$ | 1000° C. | 834–1005 | 894 |
| 3 | $SiO_2$ | 1000° C. | 685–792 | 726 |
| Control Samples | 1.5 $N_D$ glass beads* | | | 770 |
| | 1.75 $N_D$ glass beads* | | | 602 |

TABLE 1-continued

| Sample Number | Main Constituents | Firing Temperature | Knoop Hardness Range | Average |
|---|---|---|---|---|
| | 1.9 $N_D$ glass beads* | | | 566 |
| | road sand | | 141–955 | 573 |
| | sand blast sand | | | 1,117 |

*150–210 micrometer particle size
$N_D$ is refractive index

In order to compare the non-vitreous ceramic microspheres used in the present invention (having a grainy structure) with vitreous (glassy) microspheres of the same composition, $ZrO_2$—$SiO_2$ microspheres made by a thermal fusion process were obtained. These microspheres as well as the sol gel microspheres had a zirconia:silica ratio of 1:1. Samples of each of the beads were bonded to a scanning electron microscope stub with epoxy cement and ground about in half, then polished with diamond paste in order to obtain a flat cross-sectional area for a hardness measurement. The beads were indented in a Leitz microhardness tester, and data was taken as values relating to the Vickers hardness scale. The results of this testing are shown in Table 2 below.

TABLE 2

| Sample | Vickers Hardness Polished interior | Unpolished microsphere surface |
|---|---|---|
| $ZrO_2$—$SiO_2$ sol-gel microsphere fired at 900° C. | 336–498 | 464–894 |
| $ZrO_2$—$SiO_2$ sol-gel microsphere fired at 1000° C. | 274–464 | 1206–1854 |
| Fused $ZrO_2SiO_2$ microsphere (obtained from TAFA Metalization, Inc., Concord, New Hampshire) | not measurable because of spalling and/or porosity in microsphere | |

The vitreous microspheres were also white, opaque and not at all suitable for use as retroreflective lens elements.

Crush resistance of the microspheres has also been measured on an apparatus the major feature of which is two parallel plates made of very hard, non-deforming material (e.g., sapphire or tungsten carbide). A single microsphere of known diameter is placed on the lower plate and the upper plate lowered until the microsphere fails. Crush resistance is the force exerted on the microsphere at failure divided by the cross-sectional area of the microsphere ($\pi r^2$). Ten microspheres of a given composition are tested and the average result is reported as the crush resistance for the composition.

The invention will be further clarified by a consideration of the following examples which are intended to be purely exemplary.

EXAMPLE I

A nitrate stabilized zirconium oxide sol containing about 20% $ZrO_2$ by weight and about 0.83M $NO_3$ per mole $ZrO_2$ (obtained from Nyacol Products Company) was ion exchanged with an anion exchange resin (Amberlyst A-21 resin made by Rohm and Haas Company) at a ratio of about 15 g. of resin to 100 g. of the sol. To about 21 g of the resulting stable zirconia sol were added about seven grams of silica sol (Ludox LS), and then about 2.5 g of a 50% aqueous ammonium acetate solution were added to the sol with agitation. The resulting mixture (having a $ZrO_2$:$SiO_2$ mole ratio of about 1:1) was immediately added to 500 ml of 2-ethylhexanol under agitation in a 600 ml beaker. After stirring for about 5 minutes, the mixture was filtered to separate the gel particles from the alcohol. Very transparent, rigid gelled spheres up to and exceeding 1 mm in diameter were recovered. These particles were dried and subsequently fired to 1000° C. Intact, transparent to slightly translucent spheres up to and over 500 micrometers in diameter were obtained. A micro-hardness test performed on the microspheres which had been fired at 1000° C. measured about 834 to 1005 knoop. Their surface area was measured and found to be about 0.015 $m^2/g$, indicating that they were essentially fully dense. A sample of the microspheres from this example was mounted on an adhesive-coated white vinyl strip. When observed in a flashlight beam, the particles reflected brilliantly from a wide range of viewing angles. Other mixtures of zirconia sols and silica sols were made as in this example to yield microspheres with indices of refraction up to 1.91.

EXAMPLE II 625 ml (510 g) of water saturated 2-ethyl hexanol was added to an 800 ml. beaker and was stirred with a three-blade propeller mixer at about 1000 rpm. 2.5 g. of a nonionic wetting agent (Tergitol ® TMN) was added. In a second beaker, 4 grams of a solution comprising one part by weight ammonium acetate in two parts by weight water were added to 50 g. of an agitated silica sol obtained as Nalco 41D01 from Nalco Chemical Company. The contents of the second beaker was poured into the agitated 2-ethyl hexanol, and agitation was continued for about five minutes, during which gel particles formed. The gelled particles were removed by filtration. After drying at 90° C. a sample of the particles was placed in an electric furnace at 1000° C. and that temperature maintained for 30 minutes. Upon cooling, the particles were examined under a microscope. They were very clear and ranged in size from about 60 to 1000 micrometers in diameter. A few of the particles had crystallized and become opaque. The transparent microspheres produced were measured at an average hardness of 726 knoop and were observed to reflect light brightly in a flashlight beam. Surface area measurements of these particles showed them to be substantially fully dense.

It is within the scope of this invention to impart color to the transparent ceramic microspheres. The aqueous dispersions which are used to form the ceramics of this invention can contain various other water-soluble metal compounds which will impart internal color to the finished ceramic without sacrificing clarity. The adding of colorants to the transparent ceramics may be done in accordance with the teaching of U.S. Pat. No. 3,795,524 found in Col. 4, line 72-Col. 5, line 27. Colorants such as ferric nitrate (for red or orange) may be added to the dispersion in an amount of about 1 to 5 weight percent of the total metal oxide present. Color can also be imparted by the interaction of two colorless compounds under certain processing conditions (e.g., $TiO_2$ and $ZrO_2$ may interact to produce a yellow color).

The Pavement Markings

Use of microspheres less than 125 micrometers in diameter has several advantages. The first, is the fact that the ratio of surface area to volume (which is inversely proportional to the microsphere diameter) is higher for small beads than for larger beads. This higher ratio allows for better energy dissipation when the microspheres are struck by vehicle tires or abrasive particles on the highway. It also gives better adhesion of the microspheres to the binder since proportionately more binder is in contact with the microsphere, thus increasing both mechanical and chemical adhesion.

Secondly, the proportionate area of a pavement marking covered per unit weight of microspheres is inversely proportional to the bead diameter. Thus, more pavement marker area can be covered per unit weight of microspheres using the smaller diameter spheres, and the cost of the lens elements per unit area is reduced.

Pavement marking sheet material may be described as a prefabricated strip adapted to be laid on and secured to pavement for such purposes as lane dividing lines and comprises:

1. A base sheet, such as a soft aluminum foil or elastomer precursors, which is conformable to a roadway surface;
2. A top layer (also called the support film or binder film) adhered to one surface of the base sheet and being very flexible and resistant to rupture (e.g. vinyl polymers, polyurethanes, epoxies, or polyesters); and
3. A monolayer of particles such as transparent microsphere lens elements partially embedded in the top layer in a scattered or randomly separated manner.

The pavement marking sheet constructed may include an adhesive (e.g., pressure sensitive, heat or solvent activated, or contact adhesive) on the bottom of the base sheet.

Such pavement marking sheets are further described in U.S. Pat. Nos. 4,117,192; 4,248,932; and 4,490,432, the disclosures of which are incorporated by reference herein. Useful materials disclosed in these patents for polymeric base sheets are acrylonitrile-butadiene polymers, millable polyurethanes, and neoprene rubber. Polymeric base sheets are generally at least ¼ mm thick but less than 2 or 3 mm thick. Particulate fillers, such as silica, glass or ceramic microspheres, and skid resisting particles, may also be included in the polymeric base sheet.

Pavement marking sheets may be made by processes known in the art (see e.g. U.S. Pat. No. 4,248,932), one example comprising the steps of: (i) coating onto a base sheet of soft aluminum (typically less than 100 micrometers thick) a mixture of resin (e.g., epoxy and acrylonitrile butadiene elastomer mixture), pigment ($TiO_2$) and solvent (e.g., methylethylketone) to form the support film; (ii) dropping onto the wet surface of the support film ingredients a multiplicity of the transparent sol gel microspheres; and (iii) curing the support film at 150° C. for about 10 minutes. A layer of adhesive (typically 50-150 micrometers thick) is then usually coated onto the bottom of the base sheet.

The microspheres may be treated with an agent which improves adhesion between them and the top layer, or such an agent may be included in the top layer where it contacts the microspheres. Silane coupling agents coated on the microspheres or dispersed in the binder are useful for this purpose.

Pigments or other coloring agents may be included in the binder layer in an amount sufficient to color the sheet material for use as a traffic control marking. Titanium dioxide will typically be used for obtaining a white color.

Pavement marking sheet materials of this invention have been tested in a sand blast test. This test utilizes an apparatus comprised of a channel about 156 mm wide and 508 mm long in which is mounted a flat metal (e.g. aluminum) plate about 152 mm wide. The pavement marking sheet material sample being tested is adhered to the metal plate which is moved down the channel by engagement with an electric motor having a speed control. A commercial compressed air sand blast gun having a compressed air supply at 10 psig. (69 kPa) and using common sand blast sand (e.g., 70% 250/425 micrometer particle size) is directed toward a portion of the channel which must be passed by the sample. The sand blast gun is placed with its tip 762 mm from the point where sand will impact the sample, and it is oriented at about 75° to the channel such that the sample is moving toward the point where sand is impacting at a rate of about 0.04 m/sec (1½ in/sec.)

The sample passes the point of the impacting sand repeatedly, and retroreflectivity of the sample is measured after a number of passes to test the durability of the microsphere lenses.

Brightness or specific luminance is measured in units of millicandela/square foot/foot candle ($mcd/ft^2/fc$) with a photometer. Measurements are normally made with incident light at an angle of 86.5° from normal to the surface of a reflective sheet in which the microspheres have been incorporated, with a divergence angle between the light source and the photocell of 1.0°. Refer to ASTM test D4061.

EXAMPLE III

Pavement marker sheet materials of this invention made with a vinyl binder layer and microspheres having diameters ranging from 75 to 125 micrometers were subjected to the sandblast test, along with control samples similarly made with vitreous glass microspheres having various indices of refraction and of about the same size. All of the microspheres were surface treated with a silane bonding agent. All of the pavement marking sheets were covered with microspheres at a packing factor of 22%. The packing factor means the percentage of the total surface area covered by the microspheres. The data on retained reflectivity is shown in Table 3.

TABLE 3

| Microsphere Type No. of Sand Blast Passes | Retained Reflectivity | | | |
|---|---|---|---|---|
| | $ZrO_2$—$SiO_2$ Ceramic % retained | Glass | | |
| | | 1.5 $N_D$ % retained | 1.75 $N_D$ % retained | 1.9 $N_D$ % retained |
| 0 | 100 | 100 | 100 | 100 |
| 2 | 89 | 85 | 83 | 69 |
| 4 | 82 | 79 | 71 | 55 |
| 6 | 80 | 73 | 65 | 42 |

The pavement marking material of this invention retained substantially more of its original reflectivity than any of the pavement markers made with glass microspheres.

One of the reasons why microspheres smaller than 125 micrometers in diameter have not been used extensively in pavement markings is the fact that only a small amount of surface moisture (rain water or dew) or dirt will impair the optics of the markings causing them to loose retroreflectivity. In a pavement marking having a pattern or spaced protuberances bulging from its surface, wet reflectivity is less sensitive to microsphere size because moisture drains away from the high spots in the pattern or protuberances. Such pavement marking sheeting having retroreflective protuberances which carry embedded microspheres are described in U.S. Pat. Nos. 4,388,359 and 4,069,281.

The FIGURE attached hereto is a cross-sectional view of such a pavement marking sheet material 10. It comprises a deformable polymeric base sheet 11 and a layer of transparent ceramic microspheres as described herein 12 applied over the surface of the base sheet 11. The base sheet is configured with protuberances 13 separated by depressed areas or valleys 14. On the side surfaces 15 and the top surfaces 16 of the protuberances 13, the microspheres 12 are partially embedded in the surface of the sheet. This provides raised retroreflective surfaces effective for reflecting light rays from vehicle headlights. The polymeric base sheet 11 should be deformable to permit pattern impression, generally under heat and pressure. It also is desirably viscoelastic after completion of the sheet material to permit absorption of the forces and pressures of road traffic. Suitable base sheets comprise elastomer precursors as previously described. The microspheres are generally embedded between about 20 and 80% of their diameter on the side surfaces 15 of the protuberances to provide good retention and reflection. It is desired to have a high concentration of microspheres on these side surfaces because they are most directly in line with light rays from the headlights of vehicles traveling on the roadway. The protuberances typically are at least about 1 millimeter high and are spaced at least about 2 millimeters from each other in the direction of expected vehicular traffic. The base sheet 11 is typically more than 1 but less than 5 millimeters thick.

These pavement marking sheet materials may be prepared by the steps of:

(1) depositing a layer of transparent ceramic microspheres on the base sheet; and (2) embossing the base sheet to simultaneously form the protuberant areas separated by depressed areas and partially embed the microspheres into the base sheet.

In the sheet just described, the base sheet 11 serves as the binder for the microspheres.

EXAMPLE IV $ZrO_2$—$SiO_2$ transparent ceramic microspheres having a mean diameter of about 90 micrometers were flood-coated onto a polymeric base sheet (like the sheet material described in U.S. Pat. No. 4,490,432) which had been preheated to about 93° C. Flood-coating means contacting the sheet with an excess of the microspheres in order to obtain the maximum coverage of the surface. The sample was placed on a hydraulic press with top and bottom platen temperatures being at 121° C. On the bottom platen there was a plate 197 mm by 260 mm having a raised diamond shaped embossing pattern, each diamond shape being about 6.4 mm by 3.2 mm. The surface of the base sheet which had been flood coated was placed in contact with the bottom platen. The hydraulic press was then closed, and the sample was subjected to 4,130 kPa (600 psi) for 18 seconds. The resulting product had an embossed surface pattern with a multiplicity of diamond shaped protuberances corresponding to the diamond shaped pattern on the press platen and looking in cross-section similar to the FIGURE attached hereto.

Patterned pavement marking sheeting similar to that produced by Example IV, having microspheres with an average diameter less than 125 micrometers, was tested in the sandblast test previously described. The conditions of the test were slightly different from those already described as follows: compressed air supply at 62 kPa (9 psig); sandblast gun oriented at about a 60° angle; and sandblast gun placed with its tip about 737 mm from the point where the sand would impact the sample. The data for the inventive embossed pavement marking sheeting and for three controls which utilized glass beads of a similar size and various refractive indices is given in Table 4 below.

TABLE 4

| Microsphere Type No. of Sand Blast Passes | Specific Luminance at observation angle of 0.2° and entrance angle of 86° | | | |
|---|---|---|---|---|
| | $ZrO_2$—$SiO_2$ Ceramic | Glass | | |
| | | 1.5 $N_D$ | 1.75 $N_D$ | 1.9 $N_D$ |
| 0 | 2240 | 620 | 1990 | 3230 |
| 2 | 2260 | 504 | 1790 | 2290 |
| 4 | 2230 | 431 | 1530 | 1230 |
| 10 | 2120 | 326 | 1110 | 490 |
| 15 | 1940 | 228 | 850 | 274 |
| 20 | 1790 | 217 | 680 | 228 |
| % Reflectivity Retained After 20 Passes | 80 | 35 | 34 | 7 |

The superiority of the inventive pavement marking sheeting is demonstrated by its ability to retain 80% of its retroreflectivity after 20 passes through the sandblast test as compared to 35% retained reflectivity for the best of the prior art control samples.

Other embodiments of this invention will be apparent to those skilled in the art from a consideration of this specification or the practice of the invention disclosed herein. Various omissions, modifications, and alterations of this invention may be made without departing from the true scope and spirit of this invention which is indicated by the following claims.

I claim:

1. A pavement marking comprising ceramic microspheres held by a binder said microspheres being solid, transparent, non-vitreous microspheres having an average particle size of up to 125 micrometers, comprising zirconia and silica, and containing at most only minor amounts of titanium dioxide.

2. The pavement marking of claim 1 wherein the mole ratio of zirconia to silica is from about 10:1 to 1:10.

3. The pavement marking of claim 1 wherein the ceramic microspheres have a hardness greater than 500 knoop.

4. The pavement marking of claim 1 which comprises sheeting having a binder film wherein the binder is a thermoplastic resin containing the ceramic microspheres both within the body of the binder and exposed at the sheeting surface.

5. The pavement marking of claim 1 which comprises a sheet material comprising:
   A. a base sheet selected from the group consisting of aluminum foil and polymeric sheet materials;
   B. a binder layer adhered to one surface of the base sheet; and
   C. a layer of the transparent, ceramic microspheres at least partially embedded in the binder layer.

6. The pavement marking of claim 1 which is a sheet material comprising:
   (i) a viscoelastic, polymeric base sheet having a multiplicity of protuberances; and (ii) a multiplicity of the transparent ceramic microspheres located on the supported by the raised surfaces of the protuberances.

7. A coating composition comprising a mixture of binder material and ceramic microspheres which are solid, transparent, non-vitreous microspheres having an average particle size of up to 125 micrometers and which are comprised of zirconia and silica and contain at most only minor amounts of titania.

8. The coating composition of claim 7 wherein the mole ratio of zirconia to silica is about 10:1 and 1:10.

* * * * *